US011095581B2

(12) United States Patent
Castro et al.

(10) Patent No.: US 11,095,581 B2
(45) Date of Patent: Aug. 17, 2021

(54) SERVER-SIDE UI TASK CONTROL FOR ONBOARDING USERS TO A MESSAGING PLATFORM

(71) Applicant: Twitter, Inc., San Francisco, CA (US)

(72) Inventors: Ricardo Castro, Palmetto Bay, FL (US); Aastha Bhargava, San Francisco, CA (US); Murph Finnicum, San Mateo, CA (US); Vince Lee, Concord, CA (US); Abe White, Houston, TX (US); Kai Xiao Fang, New York, NY (US); Zhen Yuan, San Francisco, CA (US); Michael Lin, San Francisco, CA (US); Miguel Cervera, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 135 days.

(21) Appl. No.: 16/401,095

(22) Filed: May 1, 2019

(65) Prior Publication Data
US 2019/0342236 A1 Nov. 7, 2019

Related U.S. Application Data

(60) Provisional application No. 62/665,979, filed on May 2, 2018.

(51) Int. Cl.
*H04L 12/58* (2006.01)
*G06F 9/54* (2006.01)
(Continued)

(52) U.S. Cl.
CPC ............ *H04L 51/046* (2013.01); *G06F 9/451* (2018.02); *G06F 9/54* (2013.01); *G06F 17/18* (2013.01)

(58) Field of Classification Search
CPC . G06F 9/451; G06F 9/54; G06F 17/18; H04L 51/046
See application file for complete search history.

(56) References Cited

U.S. PATENT DOCUMENTS 10,223,653 B1 * 3/2019 Song ............... G06Q 10/063118
2010/0235430 A1 * 9/2010 Kim .................. H04M 1/72522
709/203
(Continued)

OTHER PUBLICATIONS

International Search Report and Written Opinion for International Application No. PCT/US2019/030359, dated Jun. 21, 2019, 14 pages.

Primary Examiner — Gil H. Lee
(74) Attorney, Agent, or Firm — Brake Hughes Bellermann LLP

(57) ABSTRACT

According to an aspect, a system includes a messaging platform configured to facilitate an exchange of messages between user accounts of the messaging platform, and a client application configured to communicate with the messaging platform. The messaging platform is configured to store a UI process flow relating to the on-boarding process, where the UI process flow defines a flow logic for a plurality of nodes representing tasks to be executed by the client application, and each node is defined by one or more generic UI components and configuration data that configures the generic UI components to render UI objects on a user interface of the client application. The messaging platform is configured to modify one or more of the tasks or the flow logic to change at least one aspect of the on-boarding process without requiring the client application to implement a software update.

21 Claims, 12 Drawing Sheets

(51) Int. Cl.
*G06F 17/18* (2006.01)
*G06F 9/451* (2018.01)

(56) References Cited

U.S. PATENT DOCUMENTS

2016/0127297 A1 5/2016 Irmak et al.
2017/0099253 A1 4/2017 Muthukumar et al.

* cited by examiner

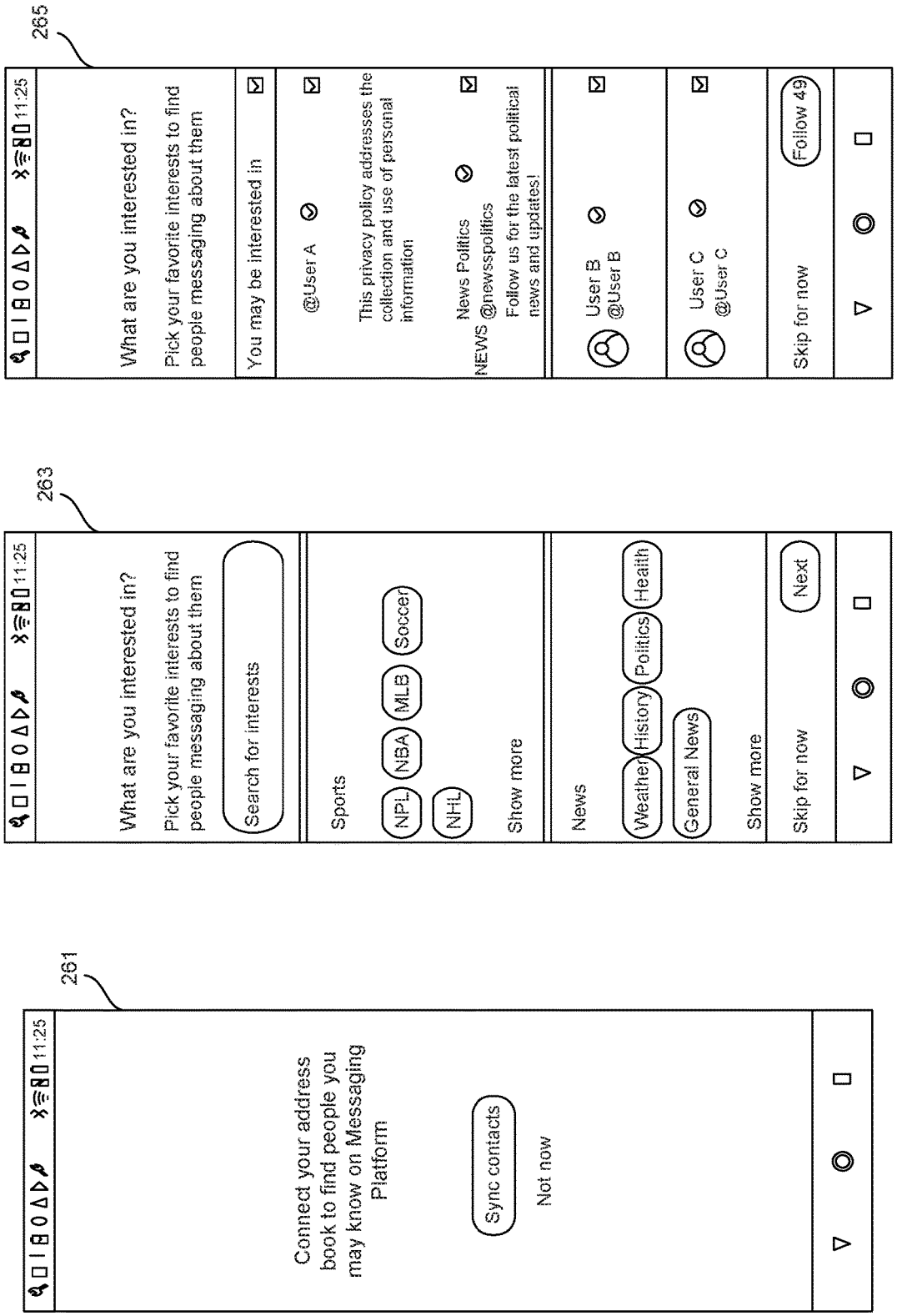

500

502 — Transmitting, by a client application executable by a computing device, a request to receive a task of a UI process flow relating to the on-boarding process from the messaging platform, the UI process flow defining a flow logic for a plurality of nodes representing tasks to be executed by the client application 504 — Receiving, by the client application, a task request from the messaging platform, the task request including an identifier of a generic UI component and configuration data that configures the generic UI component 506 — Obtaining, by the client application, the generic UI component from a library of generic UI components stored on the client application based on the identifier 508 — Rendering, by the client application, a UI object on a user interface of the client application based on the generic UI component and the configuration data 510 — Transmitting, by the client application, a task response to the messaging platform, the task response including user-provided data received via the UI object 512 — Transmitting, by the client application, a request to receive a subsequent task of the UI process

FIG. 5

SERVER-SIDE UI TASK CONTROL FOR ONBOARDING USERS TO A MESSAGING PLATFORM

RELATED APPLICATION

This application is a non-provisional of, and claims priority to, U.S. Provisional Application No. 62/665,979, filed on May 2, 2018, entitled "Onboarding Component Framework," the disclosure of which is incorporated herein in its entirety.

BACKGROUND

A messaging platform may facilitate the exchange of millions or hundreds of millions of social media messages among its users. The messages exchanged on the platform often can provide users of the platform the latest update or reporting on current events. In some examples, the messaging platform includes a messaging server configured to send social media content over a network to a client application such that the client application renders the social media content in a timeline or other parts of the client application.

In some examples, changes to the manner and timing of presenting information on the client application may require client software updates in which the users would have to install, and that may increase the amount of time and complexity to implement and test such changes. In addition, for certain types of task flows, the flow logic is mainly controlled by the client application. For example, when a new user registers to use the messaging platform, the client application may render a series of user interfaces to onboard the new user to capture information about the user (e.g., biographical data, interests, etc.), implement a security protocol (e.g., receive a code via text and then enter that code), and obtain the requisite permissions, etc. However, in some conventional messaging systems, there may be technical difficulties to implement modifications the flow of user interfaces (or modifications to the information presented within the user interfaces) during the on-boarding process.

SUMMARY

This disclosure provides a messaging platform, executable by a server computer, configured to control a series of user interfaces that are rendered on a client application executable by a computing device during a user interface (UI) process flow relating to the on-boarding of new users to the messaging platform. Instead of the client application controlling which user interfaces to display to the user during the on-boarding process, the messaging platform controls the navigation, and timing of when to display the UI layouts to prompt the user to perform actions relating to the on-boarding process. More generally, the messaging platform may track what on-boarding tasks the user has completed and provides the client application on what to display.

In some examples, the tasks of the on-boarding process may include obtain name and phone number and/or email address, verify phone, upload address book, select interests, create profile description, and/or obtain permissions, etc. The timing of when to render UI objects to execute each task of the on-boarding process may be controlled at the server computer. For example, instead of performing all of the tasks before the user begins to use the features of the messaging platform, the messaging platform may control the on-boarding process to execute some tasks (e.g., transmit digital information to the client application to render UI objects to collect the name and phone number/email address), and, then, after the messaging platform receives user-provided data in response to those initial UI layouts, the messaging platform may provide access to the content exchanged on the messaging platform so that the user can explore content on the platform and how the platform operates. Then, at some point (which is controlled by the messaging platform), the messaging platform may direct the client application to execute a subsequent task of the on-boarding process, e.g., direct the client application to render UI objects to select their interests. Then, at some later point (which is controlled by the messaging platform), the messaging platform may direct the client application to execute yet another task, e.g., direct the client application to render UI objects to upload their contacts to locate their contacts on the messaging platform. This process is repeated until all of the tasks of the on-boarding process are executed.

The location of where to render UI objects to execute each task may be controlled at the server computer. For example, the messaging platform may indicate that some on-boarding tasks direct the client application to render UI objects in a new user experience (NUX) section of the client application, while other tasks direct the client application to render UI objects in a timeline of the user or a profile of the user. The NUX section of the client application may be a series of UI layouts that capture user information relating to the on-boarding process before the user starts to use the functionality of the messaging platform (e.g., before the user receives his/her timeline). In some examples, the messaging platform directs the client application to render UI objects in the NUX section, and then injects prompts in the timeline or the profile section of the client application to execute other tasks associated with the on-boarding process. In some examples, the prompt relating to an on-boarding task that is intended to be injected into the timeline may be ranked against other injectable content. In some examples, the prompt relating to an on-boarding task that is intended to be injected to the profile may not be ranked.

The attributes of the rendered UI objects and what information is displayed in the UI objects may be controlled at the server computer. For example, for each task, the messaging platform may define the type of UI object, any UI controls (e.g., call-to-action (CTA) elements), and any information that is displayed in the rendered UI objects. In some examples, the UI objects include full cover objects, a half cover objects, an inline prompts, and alert dialog, etc.

In this manner, the UI process flow for onboarding new users may be controlled on the backend, where the client application presents information (and then returns user-provided data) according to the instructions provided on the backend system. For example, the messaging platform may store a UI process flow having a directed graph of nodes that represent tasks and links between the nodes that present the flow logic for the on-boarding process. Each of the tasks may be defined by one or more generic UI components and configuration data that configures the generic UI components to render UI objects on a user interface of the client application.

For example, a first task of the UI process flow may relate to obtaining the user's name, and the generic UI component may be an enter text component that displays data and then returns the entered data to the messaging platform. The configuration data may include the display data for the generic UI component (e.g., "enter your name) and one or more parameters that define the box that receives the user's input. In this example, the messaging platform may transmit a task request that identifies the enter text component and the configuration data that configures the enter text component in order to direct the client application to execute the first task. The client application may receive the task request, obtain the enter text component from a library of re-usable generic UI components stored on the client application, and generate a UI object on the user interface based on the enter text component and the configuration data.

A second task of the UI process flow may relate to obtaining a profile description of the user, and the second task may identify the same generic UI component (e.g., the enter text component). The configuration data for the second task may indicate the display data for the second task (e.g., "Provide a description of yourself") along with one or more parameters that define the box that receives the user's input (which may have a larger character limit than the first task). In this example, the messaging platform may transmit a task request that identifies the enter text component and the configuration data that configures the enter text component in order to direct the client application to execute the second task. The client application may receive the task request for the second task, obtain the enter text component from a library of re-usable generic UI components stored on the client application, and generate a UI object on the user interface based on the enter text component and the configuration data to execute the second task.

In this manner, since the logic of the onboarding process is controlled by the server computer, the complexity of the client application may be reduced. In addition, modifications to the on-boarding process may be quickly implemented without updating the logic of the client application (e.g., without requiring the users to perform a client update, which can be time consuming), thereby decreasing the amount of time to test or experiment with alternative features of the on-boarding process. In addition, the messaging platform may customize the onboarding process per user or a class of users. For example, the messaging platform may reorder the UI screens for the on-boarding process, not render certain UI screens that otherwise would be render as part of the normal process, or provide additional UI screens for a certain user or a class of users.

According to an aspect, a method for managing an on-boarding process of users to a messaging platform includes storing, at the messaging platform executable by a server computer, a user interface (UI) process flow relating to the on-boarding process of users to the messaging platform, receiving, by the messaging platform, a request to receive a task of the UI process flow from a client application executable by a computing device, selecting, by the messaging platform, a first task from the UI process flow, where the first task is defined by a generic UI component and configuration data that configures the generic UI component to execute the first task, transmitting, by the messaging platform, a task request to the client application, where the task request includes the configuration data and an identifier of the generic UI component such that the client application is configured to render a UI object on a user interface of the client application based on the configuration data and the identifier to prompt a user to perform an action relating to the first task, receiving, by the messaging platform, a task response from the client application, where the task response includes user-provided data received via the UI object, and selecting, by the messaging platform, a second task from the UI process flow, where the second task is defined by a generic UI component and configuration data that configures the generic UI component to execute the second task.

According to some aspect, the method may include one or more of the following features (or any combination thereof). The generic UI component may be re-usable such that a same generic UI component is used for the first task and the second task. The generic UI component of the first task may be a UI element different than the generic UI component of the second task. The method may include obtaining, by the client application, the generic UI component from a library of generic UI components stored on the client application using the identifier. The UI object may be configured to be rendered in a timeline of the user on the client application. The UI object may be configured to be rendered in a profile of the user on the client application. The method may include generating, by the client application, a secondary UI object based on the generic UI component of the second task and the configuration data of the second task, where the UI object relating to the first task is rendered in a new user experience (NUX) section of the client application, and the secondary UI object relating to the second task is rendered in a timeline associated with the user on the client application after content is displayed and viewed in the timeline. The UI process flow may define a directed graph of a plurality of nodes with links between adjacent nodes. Each of the plurality of nodes represents a different task, and the links represents flow logic of the UI process flow. The method may include modifying, by the messaging platform, at least one of the tasks or the flow logic to implement a change to at least one aspect of the UI process flow. The modifying may be programmatically executed based on user engagement data of the user with the messaging platform. The modifying may be programmatically executed based on a signal representing user intent before initiating the UI process flow relating to the on-boarding process. The method may include receiving, by the messaging platform, modification data from a client application executing on a secondary computing device, where the modification data indicates a change to a task or the flow logic, and the modifying is executed based on the modification data. The method may include providing, by the messaging platform, UI task statistics on a user interface of the client application executing on the secondary computing device, where the UI task statistics includes one or more statistics about user interactions of the tasks of the UI process flow. The method may include determining that a spamming risk level associated with a user account of the user is above a threshold level, and programmatically modifying the UI process flow in response to the spamming risk level being above the threshold level.

According to an aspect, a system for managing an on-boarding process of users to a messaging platform includes a messaging platform, executable by a server computer, configured to facilitate an exchange of messages between user accounts of the messaging platform, and a client application executable by a computing device, configured to communicate with the messaging platform via an application programming interface (API). The messaging platform includes a user interface (UI) task manager configured to store a UI process flow relating to the on-boarding process, where the UI process flow defines a flow logic for a plurality of nodes representing tasks to be executed by the client application, and each node is defined by one or more generic UI components and configuration data that configures the generic UI components to render UI objects on a user interface of the client application. The UI task manager is configured to modify one or more of the tasks or the flow logic of the UI process flow to change at least one aspect of the on-boarding process without requiring the client application to implement a software update.

The system may include one or more of the above/below features (or any combination thereof). The UI task manager is configured to modify a task of the UI process flow for a particular user account or a class of user accounts such that data displayed by a UI object rendered on the client application to execute the task for a first user account during the on-boarding process is different than data displayed by a UI object rendered on the client application to implement the task for a second user account during the on-boarding process. The UI process flow defines a first task associated with the on-boarding process, that when executed, is configured to cause the client application to render a first UI object on the user interface of the client application for a first user account, and the UI process flow defines a second task associated with the on-boarding process, that when executed, is configured to cause the client application to render a second UI object on the user interface of the client application for a second user account, where the second task is a variation of the first task. The UI task manager may include a task tracker configured to generate one or more UI task statistics for the first task and the second task. The UI task manager may be configured to cause an insertion of a UI object relating to one or more permissions to obtain user consent in response to a user account being associated with a geographical region that is different than a geographical region originally associated with the user account. The UI task manager may be configured to cause an insertion of a UI object relating to an informational announcement in a timeline or a profile of a user account.

According to an aspect, a non-transitory computer readable medium including executable instructions that when executed by at least one processor is configured to cause the at least one processor to manage an on-boarding process of users to a messaging platform, where the executable instructions includes instructions to transmit, by a client application executable by a computing device, a request to receive a task of a UI process flow relating to the on-boarding process from the messaging platform, where the UI process flow defines a flow logic for a plurality of nodes representing tasks to be executed by the client application, receive, by the client application, a task request from the messaging platform, where the task request includes an identifier of a generic UI component and configuration data that configures the generic UI component, obtain, by the client application, the generic UI component from a library of generic UI components stored on the client application based on the identifier, render, by the client application, a UI object on a user interface of the client application based on the generic UI component and the configuration data, transmit, by the client application, a task response to the messaging platform, where the task response includes user-provided data received via the UI object, and transmit, by the client application, a request to receive a subsequent task of the UI process. In some examples, the UI object is rendered in a user's timeline on the client application.

BRIEF DESCRIPTION OF DRAWINGS

FIG. 2A through 2H illustrate various UI layouts rendered on a user interface of the client application during an on-boarding process according to an aspect.

FIG. 5 illustrates a flow chart depicting example operations of an on-boarding process executable by a client application according to an aspect.

DETAILED DISCLOSURE

Figure 1A:
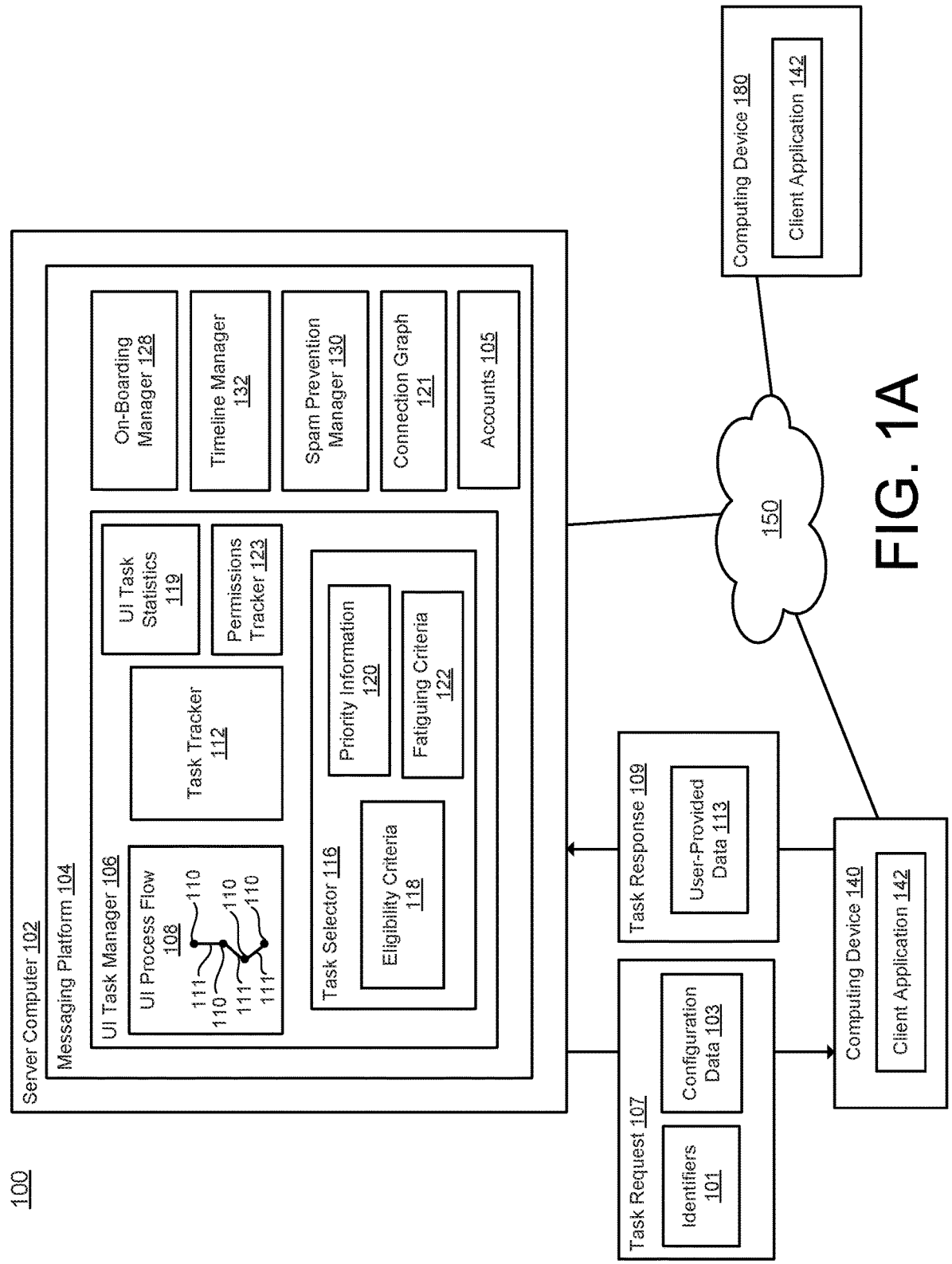
FIG. 1A is a schematic diagram of a system for managing an on-boarding users to a messaging platform according to an aspect.
Figure 1B:
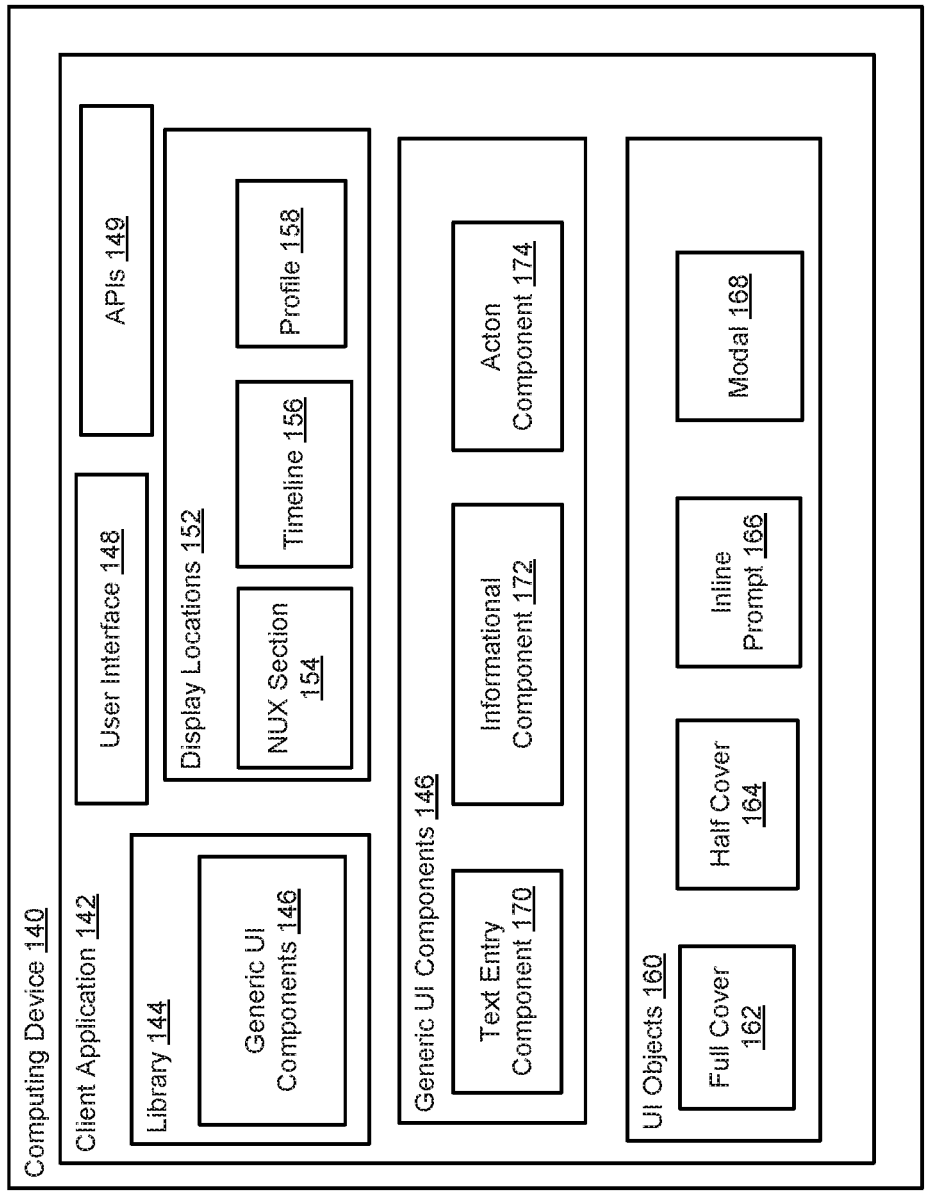
FIG. 1B is a schematic diagram of a computing device executing a client application according to an aspect.
Figure 1C:
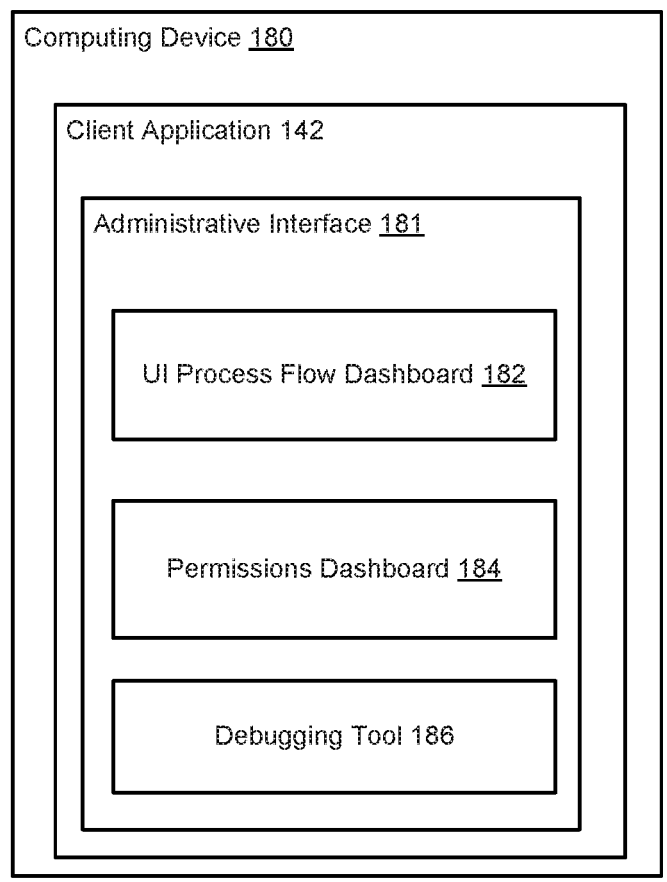
FIG. 1C is a schematic diagram of a computing device executing a client application having an administrative interface according to an aspect.

FIG. 1A is a schematic diagram of a system 100 having a messaging platform 104 executable by a server computer 102, and a client application 142 executable by a computing device 140 (or a computing device 180). FIG. 1B illustrates a schematic diagram of an example of the computing device 140 depicting features of the client application 142 according to an aspect. FIG. 1C illustrates a schematic diagram of an example of the computing device 180 depicting features of an administrative interface 181 of the client application 142 according to an aspect. The messaging platform 104 is configured to control the timing, the navigation, and the display of information on the client application 142 according to a UI process flow 108. In some examples, the UI process flow 108 includes an on-boarding process to on-board (e.g., register) new users to the messaging platform 104. The on-boarding process includes the creation of an account 105 that is stored and managed at the messaging platform 104.

The messaging platform 104 includes a UI task manager 106 configured to execute the UI process flow 108 during the on-boarding process by transmitting a task request 107 that instructs the client application 142 to render one or more UI objects 160 for a particular task of the UI process flow 108, and then receiving a task response 109 that includes user-provided data 113 resulting from the user's interaction with the UI objects 160 of the particular task. The UI task manager 106 may be incorporated into or execute in conjunction with an on-boarding manager 128. The on-boarding manager 128 may manage the registration of new users by controlling a series of UI layouts to be rendered on the user interface 148 of the client application 142 in order to create accounts 105 for the users and collect information about the user to enhance their experience on the messaging platform 104.

The UI task manager 106 is configured to control the UI process flow 108, the configuration, and which information is presented in the UI layouts of the on-boarding process (e.g., the on-boarding process may be centrally controlled at the server computer 102). For example, the UI task manager 106 is configured to prompt users to complete actions, and the UI layouts are selected and configured on the server-side. As such, adjustments to the on-boarding process may be implemented relatively quickly and without requiring a client release. Also, during the on-boarding process, the UI task manager 106 may dynamically change the on-boarding process to have the user complete some of the on-boarding actions at a later time and may prompt the user to complete certain on-boarding actions in a variety of different display locations 152 of the client application 142 such as a new user experience (NUX) 154, a timeline 156 that provides a timeline of social content (e.g., a list of ranked or unranked messages exchanged on the messaging platform 104), and/or a profile 158 that identifies information about the user, messages posted by the user on the messaging platform 104, and/or actions taken by the user on the messaging platform 104.

The UI task manager 106 is configured to define and control the UI process flow 108. The UI process flow 108 may include a directed graph of nodes 110 and links 111 between the nodes 110. Each of the nodes 110 corresponds to a task to be executed by the client application 142. The links 111 define the flow logic of the UI process flow 108. In some examples, the first task may be directed to rendering UI objects 160 to collect personal information, the second task may be directed to rendering UI objects 160 to obtain permissions, and the third task may be directed to rendering UI objects 160 to obtain information relating to the interests of the user. However, the type of task may widely vary, which may depend on the type of messaging platform.

Figure 2C:
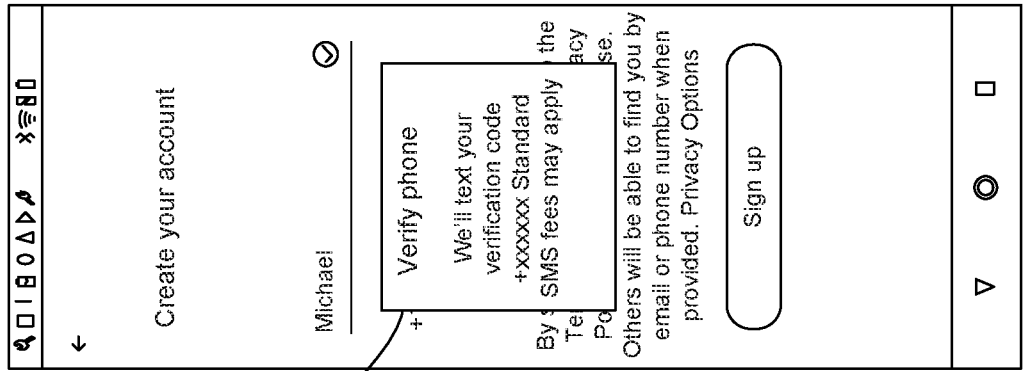
Figure 2B:
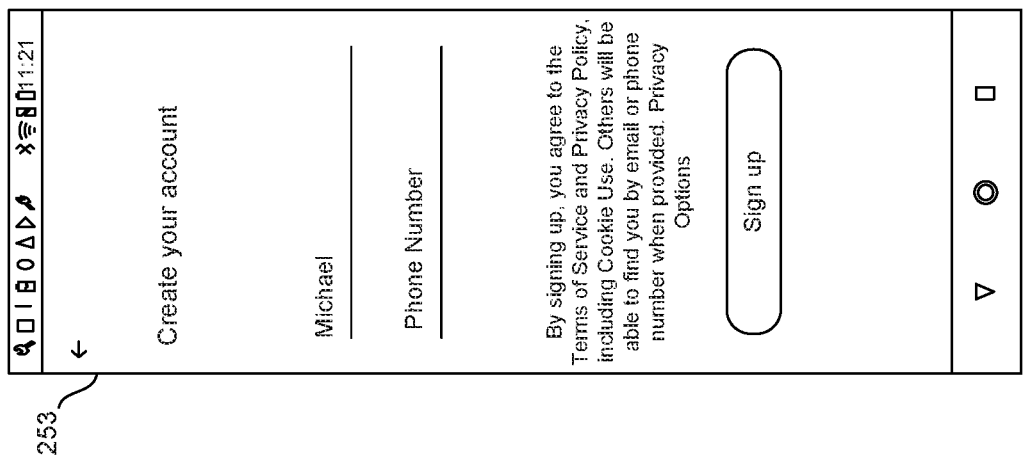
Figure 2A:
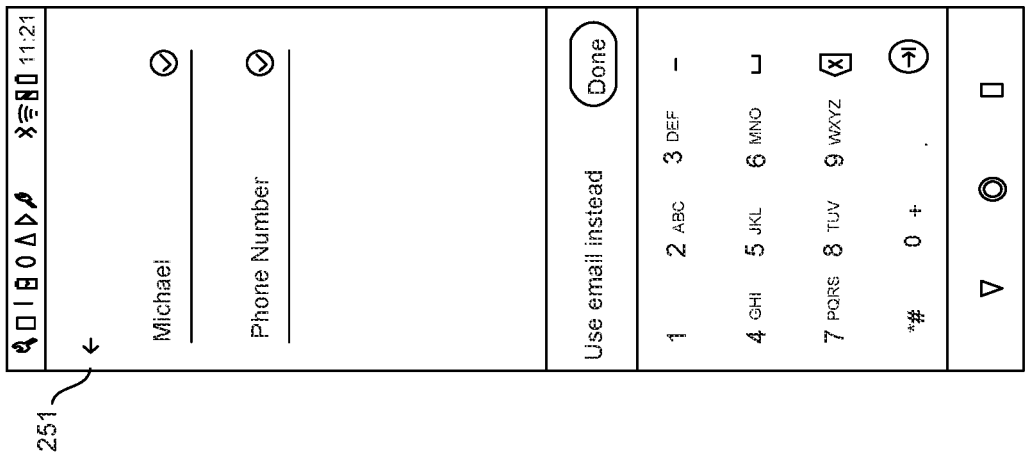
Figure 2E:
Figure 2D:

FIGS. 2A through 2H illustrates various UI layouts rendered on the user interface 148 of the client application 142 during the UI process flow 108. Referring to FIGS. 2A and 2B, UI objects in a UI layout 251 and a UI layout 253 are rendered to collect personal information of the user (e.g., name, phone number). Referring to FIG. 2C and FIG. 2D, UI objects in a UI layout 255 and a UI layout 257 are rendered to verify the phone number of the user. Referring to FIG. 2E, UI objects in a UI layout 259 is rendered to create a password for the account 105. Referring to FIG. 2F, UI objects in a UI layout 261 is rendered to sync contacts with the account 105. Referring to FIGS. 2G and 2H, UI objects in a UI layout 263 and a UI layout 265 are rendered to obtain information about the interests of the user. The UI process flow 108 may define other UI layouts relating to on-boarding such as a splash screen (e.g., the first screen show after launching the client application 142), entry of secondary contact entry (e.g., email address), email confirming message, selecting an identifier (e.g., a handle) to identify the user on the messaging platform 104, geographic permission, and notifications permission, etc.

In some examples, the UI task manager 106 may provide the UI layout 251 of FIG. 2A and the UI layout 253 of FIG. 2B in the NUX 154 during the on-boarding process. After the user enters his/her name and phone number and signs up, the UI task manager 106 may provide access to the messaging platform 104. The UI task manager 106 may provide prompts to verify the phone (e.g., related to FIGS. 2C and 2D) at a later point and in a different display location 152 such that the timeline 156 and/or the profile 158. In this manner, the user may be able to start using the messaging platform 104 relatively quickly, which can increase the chances of the user to come back to the messaging platform 104.

A task relates to computer-executable instructions to direct the client application 142 to render one or more UI objects 160 in order to prompt the user to take a particular action with respect to the on-boarding process or display information relating to the on-boarding process. For example, the nodes 110 may include a first node storing executable instruction to execute a first task of obtaining personal information (e.g., name, phone number, email address) of the user, and a second node storing executable instructions to execute a second task of selecting interests of the user (e.g., sports, news, etc.). The type of tasks may widely vary depending on the type of messaging platform, but some examples include import address book, follow accounts, select interests, provide announcements, load spinner, allow push notifications, enter full name, enter email, set password, add phone number, verify phone number, add email address, set password, select user name, and/or allow geographical permissions or other permissions.

In contrast to some conventional social media platforms, the control of the on-boarding process is controlled by the messaging platform 104 at the server computer 102. Since the logic of the UI process flow 108 is stored at the server computer, the complexity of the code of the client application 142 may be reduced. For example, with respect to the on-boarding process, the client application 142 is not required to store the logic for flow selection (which may include complex branching) and the details of the on-boarding process. Rather, the client application 142 renders and displays UI objects 160 in accordance with the task requests 107 and then returns the user-provided data 113 via the task responses 109.

In addition, modifications to the on-boarding process may be quickly implemented without requiring a software update to the client application 142, thereby decreasing the amount of time to test or experiment with alternative features of the on-boarding process. For example, in some conventional social media platforms, changes to the on-boarding process may require the user to update the client application 142. A platform may notify users of an update to the client application, and then the users would initiate the update to implement the modifications. However, the techniques described herein may permit modifications of the on-boarding process such that an update to the client application 142 is not required, thereby allowing the ability of implement changes to the on-boarding process relatively quickly. Furthermore, the techniques described herein may permit the customizing of the on-boarding process per user or a class of users. For example, the UI task manager 106 may reorder tasks, remove one or more tasks, modify one or more task, add one or more tasks a certain user or a class of users.

In some examples, the client application 142 determines a start of the UI process flow 108. For example, user may install and launch the client application 142 on the computing device 140. In some examples, upon launch the client application 142, the client application 142 may transmit a request to receive a task of the UI process flow 108. In response to the request to receive task from the client application 142, a task selector 116 may select a task from the UI process flow 108. The task selector 116 is configured to select a next task in the UI process flow 108 and determine when to execute the next task in the UI process flow 108. The details of the task selector 116 are described later in the disclosure. In some examples, the task at its respective node 110 is defined by one or more generic UI components 146 and configuration data 103 that configures the generic UI components 146. In some examples, a particular task is defined by a generic UI component 146 and the configuration data 103 that configures the generic UI component 146 to display data and/or controls for the particular task.

In some examples, a particular task is defined by multiple generic UI components 146 and the configuration data 103 that configures the multiple generic UI components 146 to display data and/or controls for the particular task. In some examples, the task links one generic UI component 146 to another generic UI component 146 (and then linked to another generic UI component 146) in which the client application 142 would render UI objects 160 on the same screen, or on subsequent screens (e.g., text entered via a UI object 160 on a first screen would cause the client application 142 to display another screen with another UI object 160).

For example, a first task of the UI process flow 108 may relate to obtaining the user's name, and the generic UI component 146 may be a text entry component 170 that displays data and then returns the entered data to the messaging platform 104. The configuration data 103 may include the display data for the generic UI component 146 (e.g., "enter your name) and one or more parameters that define the box that receives the user's input. In this example, the messaging platform 104 may transmit a task request 107 that includes an identifier 101 that identifies the generic UI component 146 (e.g., the enter text component) and the configuration data 103 that configures the generic UI component 146 in order to direct the client application 142 to execute the first task. The client application 142 may receive the task request 107, obtain the text entry component 170 from a library 144 of generic UI components 146 stored on the client application 142 using the identifier 101, and generate a UI object 160 on the user interface 148 based on the generic UI component 146 and the configuration data 103.

Figure 3B:
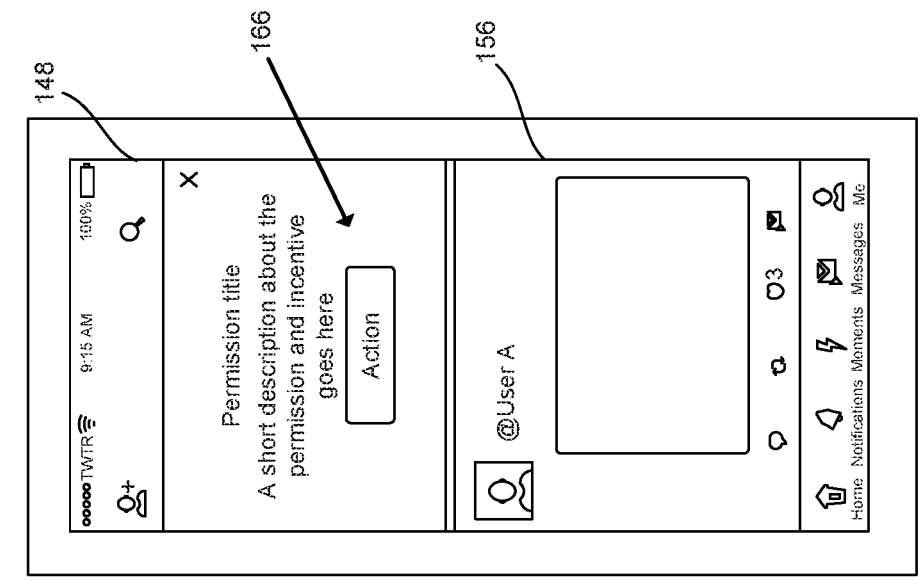
FIGS. 3A through 3D illustrate various generic UI objects rendered on the user interface of the client application during the on-boarding process according to an aspect.
Figure 3A:
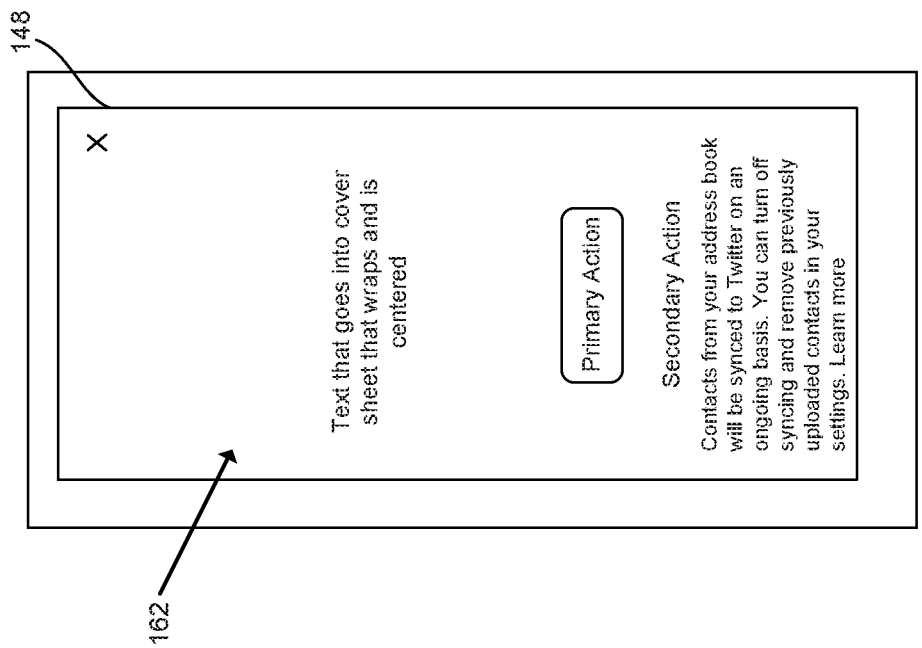
Figure 3D:
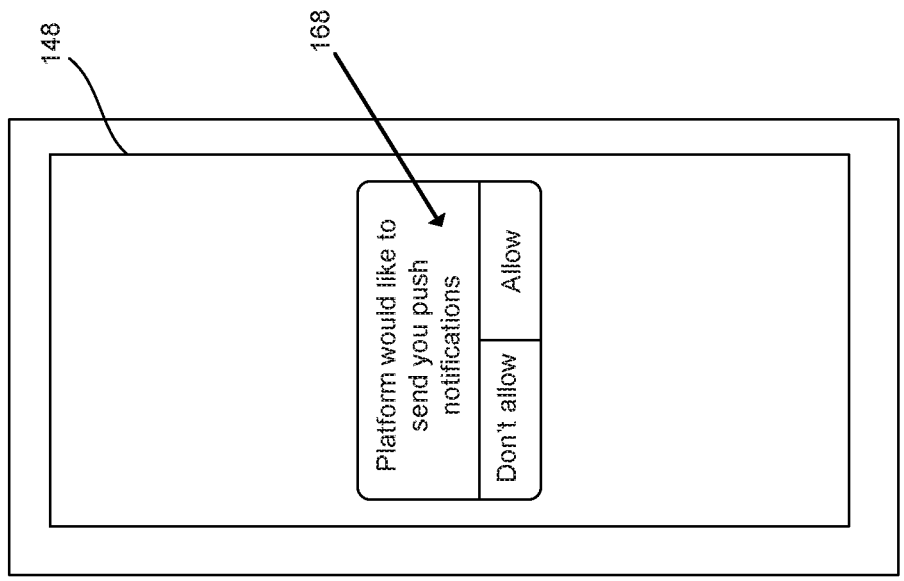
Figure 3C:
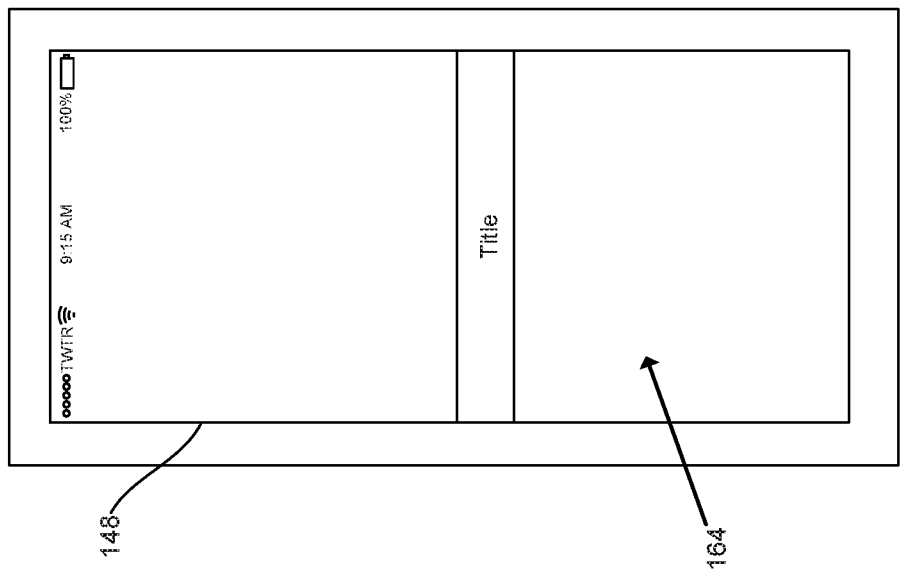

In some examples, the UI objects 160 include a full cover 162. The full cover 162 may cover the user interface 148 of the client application 142. In some examples, the start of the UI process flow 108 provides the full cover 162 as the UI object 160. In some examples, the UI object 160 includes a half cover 164 that cover approximately half of the user interface 148 of the client application 142, which allows the user to still view a portion of the information presented on the user interface 148. In some examples, the UI object 160 include an inline prompt 166. In some examples, the UI object 160 include a modal 168. FIG. 3A illustrates an example of the full cover 162 on the user interface 148. FIG. 3B illustrates an example of the inline prompt 166 inserted into a timeline 156 of the user on the user interface 148. FIG. 3C illustrates an example of the half cover 164 on the user interface 148. FIG. 3D illustrates an example of the modal 168 on the user interface 148.

Referring back to FIGS. 1A through 1C, the library 144 may include a variety of generic (re-usable) UI components 146 that are powered by the configuration data 103 received from the messaging platform 104. In some examples, each of the generic UI components 146 may be configured to have a title, a subtitle, a body, a call-to-action (CTA), and/or a second CTA. The configuration data 103 received from the UI task manager 106 may provide the information that populates and defines the display/control parameters for the title, the subtitle, the body, the CTA and/or the secondary CTA of the generic UI component 146. In some examples, the generic UI components 146 includes one or more field blocks that present data received from the backend. In some examples, the generic UI components 146 include JavaScript Object Notation (JSON) fields configured by the backend. The generic UI components 146 are configurable, e.g., text, button links, layout, etc. In some examples, the generic UI components 146 include an alert dialog, a text entry, a two button call-to-action (CTA).

In some examples, the generic UI components 146 includes a text entry component 170 that displays information provided by the UI task manager 106 and then returns the data supplied by the user to the UI task manager 106. In some examples, the generic UI components 146 include an informational UI component 172 that only displays information provided by the UI task manager 106. In some examples, the generic UI components 146 includes an action UI component 174 that provides a UI layout (e.g., custom UI layout with one or more CTAs) that is tailored to the action being requested.

Upon reviewing the UI object 160 on the user interface 148 relating to the first task (e.g., obtaining the full name of the user), the user interacts with the UI object 160 (e.g., entering the full name of the user), and the client application 142 sends a task response 109 with the user-provided data 113 back to the messaging platform 104. For example, the display of the UI object 160 may cause the user to interact with the client application 142 (e.g., making a selection, entering text, etc.). The information that is received via the UI object 160 is transmitted back to the UI task manager 106, and the UI task manager 106 determines whether to select the next task in the UI process flow 108. In some examples, after the completion of the task, the client application 142 is configured to periodically transmit a request to receive a subsequent task.

Then, the task selector 116 selects the next task as indicated by the UI process flow and the process repeats. A second task of the UI process flow 108 may relate to obtaining a profile description of the user, and the second task may identify the same generic UI component 146 (e.g., the text entry component 170). The configuration data 103 for the second task may indicate the display data for the second task (e.g., "Provide a description of yourself") along with one or more parameters that define the box that receives the user's input (which may have a larger character limit than the first task). In this example, the messaging platform 104 may transmit a task request 107 that identifies the text entry component 170 and the configuration data 103 that configures the text entry component 170 in order to direct the client application 142 to execute the second task. The client application 142 may receive the task request 107 for the second task, obtain the enter text entry component 170 from the library 144 stored on the client application 142, and generate a UI object 160 on the user interface 148 based on the text entry component 170 and the configuration data 103 to execute the second task. As described above, the same generic UI component (e.g., the text entry component 170) is used for the first task and the second task. In some examples, the generic UI component 146 for a particular task is different than the generic UI component 146 for another task.

The location of where to render UI objects 160 to execute each task may be controlled at the server computer 102. For example, the UI task manager 106 may indicate that some on-boarding tasks direct the client application 142 to render UI objects 160 in a new user experience (NUX) section 154 of the client application 142, while other tasks direct the client application 142 to render UI objects 160 in a timeline 156 of the user or a profile 158 of the user.

The NUX section 154 of the client application 142 may be a series of UI layouts that capture user information relating to the on-boarding process before the user starts to use the functionality of the messaging platform 104 (e.g., before the user receives his/her timeline 156). In some examples, the UI task manager 106 directs the client application 142 to render UI objects 160 in the NUX section 154, and directs the client application 142 to render UI objects 160 in the timeline 156 or the profile 158 of the user of the client application 142 to execute other tasks associated with the on-boarding process.

In some examples, in the timeline 156, the UI objects 160 may be presented as the injected prompts 166. In some examples, the injected prompts 166 may be ranked against other injectable content by a timeline manager 132. For example, the UI task manager 106 may provide the timeline manager 132 with a task to be executed and a recommend priority, and the timeline manager 132 may rank this injectable prompt 166 against other injectable content. In some examples, UI objects 160 configured to be injected into the profile 158 and not ranked.

In some examples, the UI task manager 106 is configured to modify at least one of the tasks or the flow logic to implement a change to at least one aspect of the UI process flow 108. For example, the UI task manager 106 may modify the instructions to implement a certain task at a node 110 of the UI process flow 108. For example, an administrator may change the display data for entering personal information by modifying the instructions at the node 110 of the UI process flow 108. This change may be implemented without requiring a client update. Also, the administrator may change an aspect to the task for a certain class of users, but keep the original task for another class of users, and then compare the statistics to determine if the changed version is an improvement. Also, the UI task manager 106 may modify the links 111 so that the flow logic is changed. In some examples, the modifying is programmatically executed based on user engagement data of the user with the messaging platform 104. In some examples, the modifying is programmatically executed based on one or more signals representing user intent before initiating the UI process flow 108 relating to the on-boarding process.

In some examples, the messaging platform 104 includes a spam prevention manager 130 configured to determine whether a spamming risk level associated with a user account 105 is above a threshold level, and the UI task manager 106 is configured to programmatically modify the UI process flow 108 in response to the spamming risk level being above the threshold level. For example, if the spamming risk level is above the threshold level, the UI task manager 106 may insert one or more additional tasks in the UI process flow 108 to provide additional security.

In some examples, the task selector 116 may select the next node 110 (or task) based on eligibility criteria 118. For example, the eligibility criteria 118 may define a list of conditions per task that determine which users should complete the task. In some examples, the eligibility criteria 118 may include completion of one or more tasks, user having less than Z follows, and/or user is not in certain countries. In some examples, the task selector 116 may not select one or more tasks in the UI process flow 108 (that otherwise would be required) if their usage demonstrates to slip those tasks. For example, if the user has already uploaded an address book from a different account on the same device, the task selector 116 may determine to skip the task relating to uploading an address book.

In some examples, the task selector 116 is configured to select a task based on priority information 120. In some examples, the priority information 120 may provide a priority level for each task represented in the UI process flow 108. If a user is eligible for more than one task at the same time, the task selector 116 may recommend the tasks in a priority order.

In some examples, the task selector 116 is configured to select a task based on fatiguing criteria 122. For example, fatiguing may be handled by the location presenting the tasks. When a task is viewed in the timeline 156, the timeline manager 132 may determine when to show the task to the user. When a task is view on the profile 158, the fatiguing criteria 122 may specify certain conditions to avoid overwhelming the user. In some examples, a task tracker 112 is configured to record when a user has viewed a UI object 160 (e.g., a prompt) and either dismissed it or scrolled past. In some examples, the fatiguing criteria 122 may define configured fatigue time which sets the duration of time before the user is eligible to see the same UI object 160 again. In some examples, the fatiguing criteria 122 may define a maximum number of retries for each prompt to avoid spamming users forever.

The UI task manager 106 is configured to generate and store UI task statistics 119 relating to the UI process flow 108 for each account 105. For example, the UI task statistics 119 may include all tasks viewed by an individual user along with completion rate, dismiss rate, and timestamps, and the identification of which UI process flows 108 entered by a user, and the data requested by a relevance work-stream. In addition, the UI task statistics 119 may include statistics by location (e.g., NUX 154, timeline 156, and/or profile 158), impressions, click through rate, engagement or action performed, dismiss rate, time to complete, flow performance by location, funnel view showing drop off at each task, and/or overall time to complete.

The UI task manager 106 includes a permissions tracker 123 configured to track the status of device permissions over time such as contacts, camera, push notifications, geographical, media gallery (e.g., photos), and microphone permissions, as well as notifications, notifications style, badges (e.g., on/off), alerts (e.g., on/off), sounds (e.g., on/off), contacts, account permission, device permission, etc.

In some examples, an administrative interface 181 of the client application 142 executable by the computing device 180 is configured to manage the UI process flows 108 implemented by the UI task manager 106. For example, the administrative interface 181 includes a UI process flow dashboard 182 that allows an administrator to add, delete, and/or modify UI process flows 108. Also, the UI process flow dashboard 182 may display any of the UI task statistics 119. For example, the UI task manager 106 may received modification data from the client application 142 executing on the computing device 180, where the modification data indicates a change to a task or the flow logic of the UI process flow 108.

In addition, the administrative interface 181 includes a permissions dashboard 184 that allows an administrator to add, delete, and/or modify permissions presented to the user. In addition, the permission dashboard 184 may display the status of any of the permissions tracked by the permission tracker 123. In some examples, the permission dashboard 184 may allow the permission data to be filtered by country, client Platform, operating system version, and/or client version. In some conventional systems, scribe events are examined or custom programming code is developed to obtain which users have yet to complete certain basic tasks such as providing device permissions, and these conventional approaches may be relatively time consuming. In some examples, the administrative interface 181 includes a debugging tool 186 configured to inject targeted prompts into the client application 142. For example, the debugging tool 186 may receive one or more user identifiers, and then create one or more prompts to inserts those prompts on the user interface of the client application 142.

The client application 142 is configured to communicate with the messaging platform 104 over a network 150. The client application 142 may be a native application executing on an operating system of the computing device 140 (or the computing device 180) or may be a web-based application executing on the server computer 102 (or another server) in conjunction with a browser-based application of the computing device 140. The computing device 140 (or the computing device 180) may access the messaging platform 104 via the network 150 through the use of any type of network connections and/or application programming interfaces (APIs) 149 in a manner that permits the client application 142 and the messaging platform 104 to communicate with each other.

The messaging platform 104 and the client application 142 are configured to facilitate real-time communication between users. The messaging platform 104 may store millions of accounts 105 of individuals, businesses, and/or entities (e.g., pseudonym accounts, novelty accounts, etc.). One or more users of each account 105 may use the client application 142 to send messages to other accounts 105 inside and/or outside of the messaging platform 104. The messages may include video, images, and/or text. The messaging platform 104 may be configured to enable users to communicate in "real-time", i.e., to converse with other users with minimal delay and to conduct a conversation with one or more other users during simultaneous sessions. In other words, the messaging platform 104 may allow a user to broadcast messages and may display the messages to one or more other users within a reasonable time frame so as to facilitate a live conversation between users.

Recipients of a message may have a predefined graph relationship with an account 105 of the user broadcasting the message in a connection graph 121 on the server computer 102. In some examples, a portion of the connection graph 121 is included in the client application 142. The connection graph 121 is a data structure representing relationships (i.e., connections) between one or more entities. For example, the connection graph 121 may be a data set that stores relationships between the accounts 105. Relationships may include friending, following, linking, or some other relationship. An entity is directly connected to another entity in the connection graph 121 when the two entities are connected by a path length of one, i.e., there are no intervening nodes.

The computing device 140 may be a mobile computing device (e.g., a smart phone, a PDA, a tablet, a laptop computer, a wearable device, such as a wrist or head mounted device, a virtual reality device, a drone equipped camera etc.) or a non-mobile computing device (e.g., a desktop computing device). The computing device 140 also includes various network interface circuitry, such as for example, a mobile network interface through which the computing device 140 can communicate with a cellular network, a Wi-Fi network interface with which the computing device 140 can communicate with a Wi-Fi base station, a Bluetooth network interface with which the computing device 140 can communicate with other Bluetooth devices, and/or an Ethernet connection or other wired connection that enables the computing device 140 to access the network 150.

The server computer 102 may be a single computing device, or may be a representation of two or more distributed computing devices communicatively connected to share workload and resources. The server computer 102 may include at least one processor and a non-transitory computer-readable medium that stores executable instructions that when executed by the at least one processor cause the at least one processor to perform the operations discussed herein.

Figure 4:
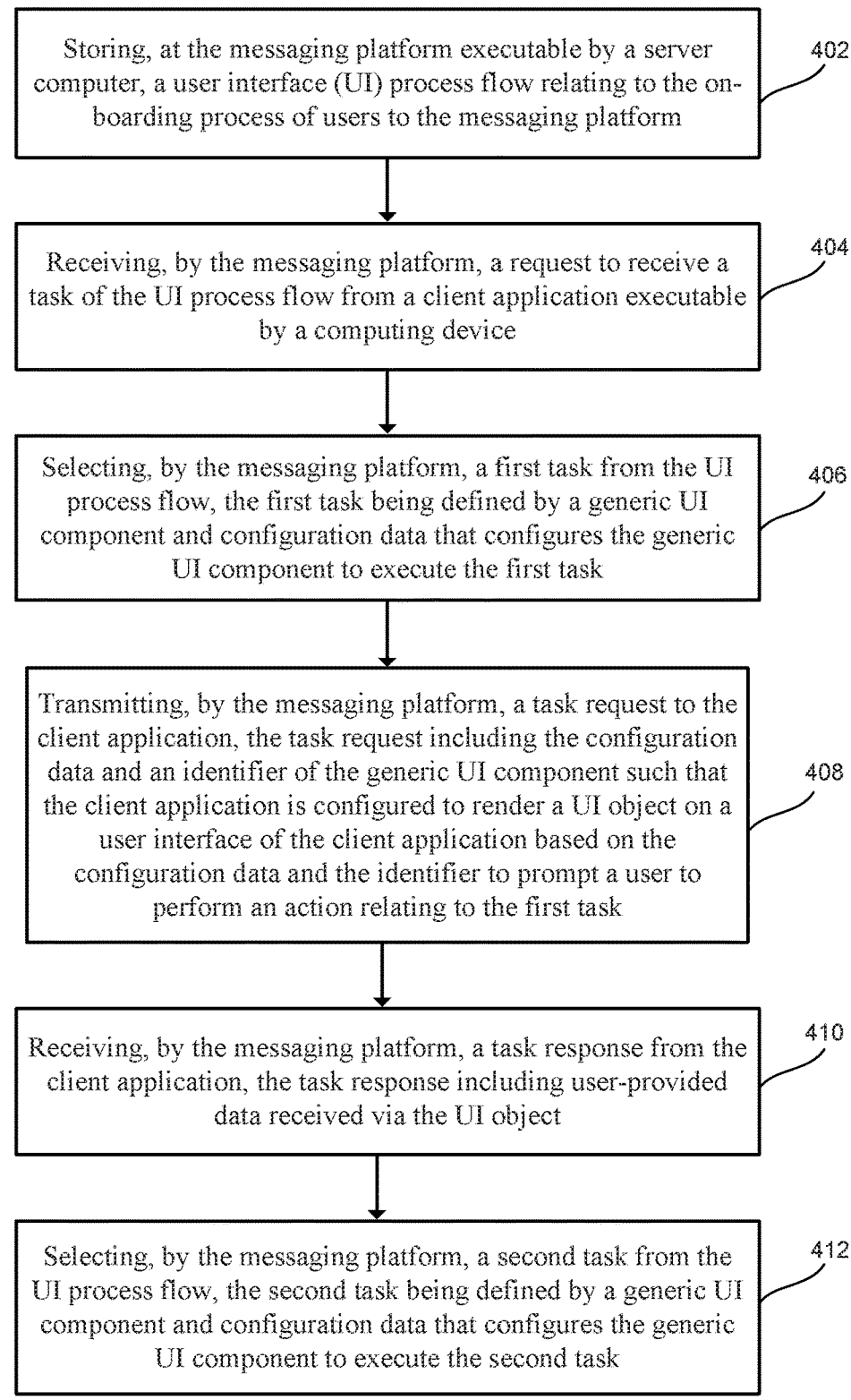
FIG. 4 illustrates a flow chart depicting example operations of an on-boarding process executable by a messaging platform according to an aspect.

FIG. 4 illustrates a flow chart 400 depicting example operations of an on-boarding process executable by a messaging platform 104 according to an aspect.

Operation 402 includes storing, at the messaging platform 104 executable by a server computer 102, a UI process flow 108 relating to the on-boarding process of users to the messaging platform 104. Operation 404 includes receiving, by the messaging platform 104, a request to receive a task of the UI process flow 108 from a client application 142 executable by a computing device 140. Operation 406 includes selecting, by the messaging platform 104, a first task from the UI process flow 108, the first task being defined by a generic UI component 146 and configuration data 103 that configures the generic UI component 146 to execute the first task.

Operation 408 includes transmitting, by the messaging platform 104, a task request 107 to the client application 142, where the task request 107 including the configuration data 103 and an identifier 101 of the generic UI component 146 such that the client application 142 is configured to render a UI object 160 on a user interface 148 of the client application 142 based on the configuration data 103 and the identifier 101 to prompt a user to perform an action relating to the first task. Operation 410 includes receiving, by the messaging platform 104, a task response 109 from the client application 142, where the task response 109 includes user-provided data 113 received via the UI object 160. Operation 412 includes selecting, by the messaging platform 104, a second task from the UI process flow 108, where the second task is defined by a generic UI component 146 and configuration data 103 that configures the generic UI component 146 to execute the second task.

FIG. 5 illustrates a flow chart 500 depicting example operations of an on-boarding process executable by a client application 142 according to an aspect.

Operation 502 includes transmitting, by a client application 142 executable by a computing device 140, a request to receive a task of a UI process flow 108 relating to the on-boarding process from the messaging platform 104, where the UI process flow 108 defines a flow logic for a plurality of nodes 110 representing tasks to be executed by the client application. Operation 504 includes receiving, by the client application 142, a task request 107 from the messaging platform 104, where the task request 107 includes an identifier 101 of a generic UI component 146 and configuration data 103 that configures the generic UI component 146. Operation 506 includes obtaining, by the client application 142, the generic UI component 146 from a library 144 of generic UI components stored on the client application 142 based on the identifier 101.

Operation 508 includes rendering, by the client application, a UI object 160 on a user interface 148 of the client application 142 based on the generic UI component 146 and the configuration data 103. Operation 510 includes transmitting, by the client application 142, a task response 109 to the messaging platform 104, where the task response 109 includes user-provided data 113 received via the UI object 160. Operation 512 includes transmitting, by the client application 142, a request to receive a subsequent task of the UI process flow 108.

Figure 6:
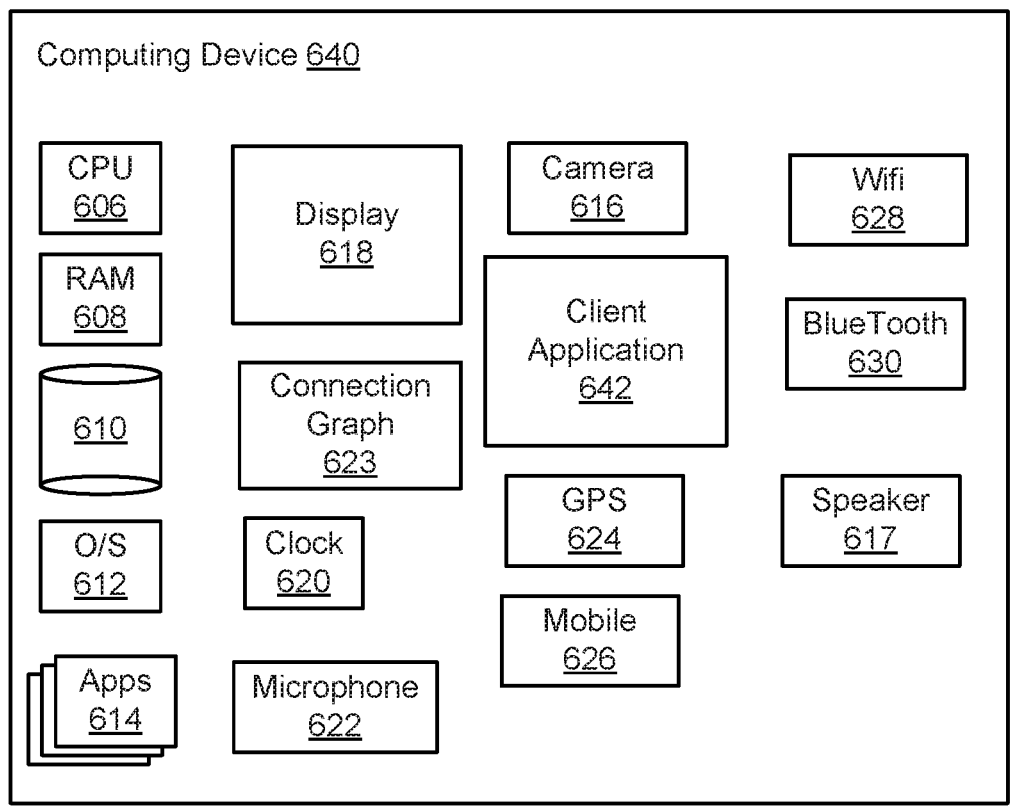
FIG. 6 illustrates an example of a computing device according to an aspect.

FIG. 6 is a schematic diagram of a computing device 640 according to another implementation. In some examples, the computing device 640 is the computing device 140 or the computing device 180 of FIGS. 1A through 1C.

As shown in FIG. 6, the computing device 640 may include one or more processors 606 (e.g., a processor formed in a substrate, such as a central processing unit, a graphics processor, etc.), a volatile memory 608, and nonvolatile memory 610. The volatile memory 608 may store, for example, instructions that are executed by the processor(s) 606, and the nonvolatile memory 610 may store, for example, various user data, instructions for executing an operating system, applications, etc.

The computing device 640 may include a plurality of applications 614, which can be executed by the computing device 640 (e.g., by the processor 606 executing one or more instructions stored in memory 608 or 610 that correspond to the application) and which may communicate with the operating system 612 (e.g., through one or more application programming interfaces (APIs)). Execution of the applications 614 can provide various functionalities to a user of the computing device 640. In a few examples, an email application may, with a user's permission, provide access to the user's email account and email messages associated with the account. A browser application may provide a Web browser to a user, so that the user may access content that can be loaded into, and displayed by, the browser application.

A client application 642 can provide content to the user from contacts and sources that the user has chosen to be associated with the messaging platform. A camera application can provide access to use of a camera 616 within the computing device 640 for capturing still pictures or video. In some implementations, the camera 616 may be external to the computing device 640, such as a camera that communicates wirelessly, e.g., via BLUETOOTH or Wi-Fi, with the computing device 640. Applications that provide a rich variety of other functionalities and information to the user also can be provided. In some implementations, the client application 642 may be considered one of the applications 614. The client application 642 may be the client application 142 of FIGS. 1A through 1C.

The computing device 640 includes a display 618 (e.g., a touchscreen display, an LED display, etc.) that can display a user interface for an application 614 that is being executed by the device. More than one application can be executed at a time. However, in some implementations (e.g., in the case of a smart phone), the size of the display is better suited for a single executing application to be displayed at a time. The executing application that is displayed on the display 618 can be referred to as a "front-facing" application. In some implementations, the display 618 may be housed in a structure separate from a structure housing one or more of the other components of the computing device 640 (e.g., the display 618 is a stand-alone display).

The computing device 640 may include internal speakers 617 that can provide an audio output from the device. The computing device 640 may also include a port or interface (e.g., USB, micro-USB, cable interfaces, HDMI, wireless interface, etc.) that can be used to connect the computing device 640 to external devices, e.g., speakers that may provide an audio output when connected to the device 640 or other types of sensors, cameras, or computing devices. The computing device 640 may also include a microphone 622 that detects sound in the environment of the computing device 640. In some implementations, the microphone 622 may be external to the computing device 640. The microphone 622, whether internal or external, may provide audio for a live video stream.

The computing device 640 may also include a clock 620 that determines a time and date and may include a GPS transceiver 624 that communicates with a global positioning system to determine a location of the computing device 640. The location may be provided as part of the metadata associated with a message routed through the messaging platform. The computing device 640 also includes various network interface circuitry, such as for example, a mobile network interface 626 through which the computing device 640 can communicate with a cellular network, a Wi-Fi network interface 628 with which the computing device 640 can communicate with a Wi-Fi base station, a BLUETOOTH network interface 630 with which the computing device 640 can communicate with other BLUETOOTH devices (e.g., an external camera, microphone, or speakers), and/or an Ethernet connection or other wired connection that enables the computing device 640 to access the network 150 of FIG. 1. The computing device 640 may include other sensors (not shown), such as, for example, an ambient light sensor, a temperature sensor, physical orientation sensors, and/or an accelerometer, etc. In some examples, a connection graph 623 may be a subset of the connection graph 121 of FIG. 1A that resides on the server computer 102 of FIG. 1A. A connection graph is a data structure representing relationships (i.e., connections) between one or more entities. For example, the connection graph 623 may be a data set that stores relationships between the accounts 105 of FIG. 1A. Relationships may include friending, following, linking, or some other relationship. An entity is directly connected to another entity in the connection graph 623 when the two entities are connected by a path length of one, i.e., there are no intervening nodes.

Figure 7:
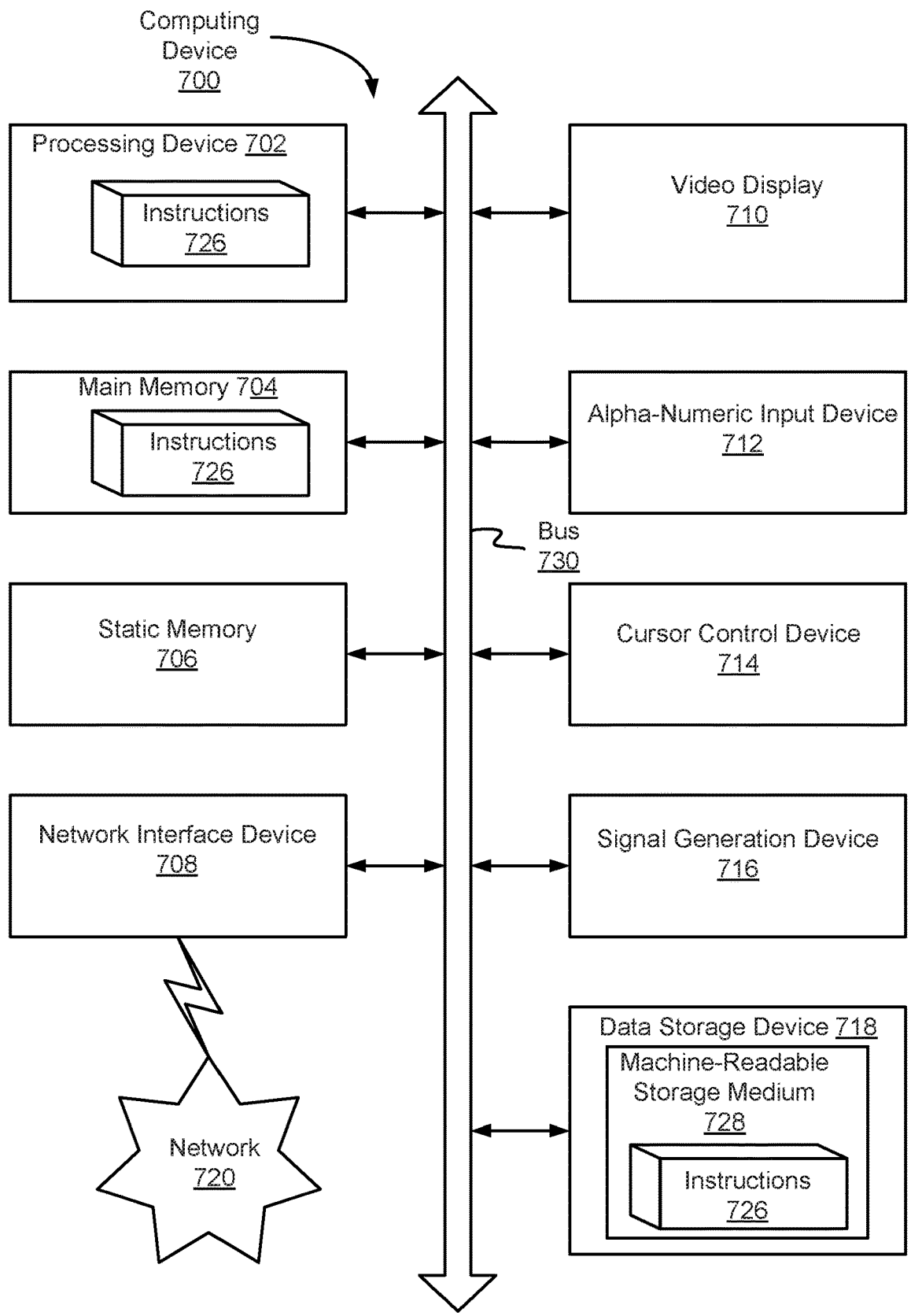
FIG. 7 illustrates an example of a computing device according to another aspect.

FIG. 7 is a diagrammatic representation of a machine in the example form of a computing device 700 within which a set of instructions, for causing the machine to perform any one or more of the messaging platform 104 executing on the server computer 102 of FIG. 1A. The computing device 700 may be a rackmount server, a server computer, or a mainframe computer, within which a set of instructions, for causing the machine to perform any one or more of the functions with respect to the messaging platform 104 of FIG. 1A discussed herein. In some examples, the computing device 700 may operate in the capacity of a server machine in client-server network environment. Further, while only a single machine is illustrated, the term "machine" shall also be taken to include any collection of machines that individually or jointly execute a set (or multiple sets) of instructions to perform any one or more of the functions of the messaging platform 104 of FIG. 1A discussed herein.

In some examples, the computing device 700 includes a processing device (e.g., a processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 718, which communicate with each other via a bus 730.

In some examples, processing device 702 represents one or more processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the functions and steps discussed herein.

In some examples, the computing device 700 may further include a network interface device 708 which may communicate with a network 720. In some examples, the network 720 may be the network 150 of FIG. 1A. In some examples, the computing device 700 may be associated with a video display unit 710 (e.g., a liquid crystal display (LCD) or a cathode ray tube (CRT)), an alphanumeric input device 712

(e.g., a keyboard), a cursor control device 714 (e.g., a mouse) and a signal generation device 716 (e.g., a speaker). In some examples, the video display unit 710, the alphanumeric input device 712, and the cursor control device 714 may be combined into a single component or device (e.g., an LCD touch screen).

The data storage device 718 may include a computer-readable storage medium 728 on which is stored one or more sets of instructions 726 embodying any one or more of the methodologies or functions described herein. The instructions 726 may also reside, completely or at least partially, within the main memory 704 and/or within the processing device 702 during execution thereof by the computing device 700, the main memory 704 and the processing device 702 also constituting computer-readable media. In some examples, the instructions may further be transmitted or received over the network 720 via the network interface device 708.

While the computer-readable storage medium 728 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that implementations of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or subcombinations of the functions, components and/or features of the different implementations described.

What is claimed is:

1. A method for managing an on-boarding process of users to a messaging platform, the method comprising:
    storing, at the messaging platform executable by a server computer, a user interface (UI) process flow relating to the on-boarding process of users to the messaging platform;
    receiving, by the messaging platform, a request to receive a task of the UI process flow from a client application executable by a computing device;
    selecting, by the messaging platform, a first task from the UI process flow, the first task being defined by a first generic UI component and configuration data that configures the first generic UI component to execute the first task;
    transmitting, by the messaging platform, a task request to the client application, the task request including the configuration data and an identifier of the first generic UI component such that the client application is configured to render a UI object on a user interface of the client application based on the configuration data and the identifier to prompt a user to perform an action relating to the first task;
    receiving, by the messaging platform, a task response from the client application, the task response including user-provided data received via the UI object; and
    selecting, by the messaging platform, a second task from the UI process flow, the second task being defined by a second generic UI component and configuration data that configures the second generic UI component to execute the second task.

2. The method of claim 1, wherein the first generic UI component and the second generic UI component relate to a same component.

3. The method of claim 1, wherein the first generic UI component is different than the second generic UI component.

4. The method of claim 1, further comprising:
    obtaining, by the client application, the first generic UI component from a library of generic UI components stored on the client application using the identifier.

5. The method of claim 1, wherein the UI object is configured to be rendered in a timeline of the user on the client application.

6. The method of claim 1, wherein the UI object is configured to be rendered in a profile of the user on the client application.

7. The method of claim 1, further comprising:
    generating, by the client application, a secondary UI object based on the second generic UI component and the configuration data of the second task;
    wherein the UI object relating to the first task is rendered in a new user experience (NUX) section of the client application,
    wherein the secondary UI object relating to the second task is rendered in a timeline associated with the user on the client application after content is displayed and viewed in the timeline.

8. The method of claim 1, wherein the UI process flow defines a directed graph of a plurality of nodes with links between adjacent nodes, each of the plurality of nodes representing a different task, the links representing flow logic of the UI process flow, the method further comprising:
    modifying, by the messaging platform, at least one of the tasks or the flow logic to implement a change to at least one aspect of the UI process flow.

9. The method of claim 8, wherein the modifying is programmatically executed based on user engagement data of the user with the messaging platform.

10. The method of claim 8, wherein the modifying is programmatically executed based on a signal representing user intent before initiating the UI process flow relating to the on-boarding process.

11. The method of claim 8, further comprising:
    receiving, by the messaging platform, modification data from a client application executing on a secondary computing device, the modification data indicating a change to a task or the flow logic, wherein the modifying is executed based on the modification data.

12. The method of claim 11, further comprising:
    providing, by the messaging platform, UI task statistics on a user interface of the client application executing on the secondary computing device, the UI task statistics including one or more statistics about user interactions of the tasks of the UI process flow.

13. The method of claim 1, further comprising:
    determining that a spamming risk level associated with a user account of the user is above a threshold level; and
    programmatically modifying the UI process flow in response to the spamming risk level being above the threshold level.

14. A system for managing an on-boarding process, the system comprising:
    a messaging platform, executable by a server computer, configured to facilitate an exchange of messages between user accounts of the messaging platform; and
    a client application executable by a computing device, configured to communicate with the messaging platform via an application programming interface (API),
    the messaging platform including a user interface (UI) task manager configured to store a UI process flow relating to the on-boarding process, the UI process flow defining a flow logic for a plurality of nodes representing tasks to be executed by the client application, each node being defined by one or more generic UI components and configuration data that configures the generic UI components to render UI objects on a user interface of the client application,
    the UI task manager configured to modify one or more of the tasks or the flow logic of the UI process flow to change at least one aspect of the on-boarding process without requiring the client application to implement a software update.

15. The system of claim 14, wherein the UI task manager is configured to modify a task of the UI process flow for a particular user account or a class of user accounts such that data displayed by a UI object rendered on the client application to execute the task for a first user account during the on-boarding process is different than data displayed by a UI object rendered on the client application to implement the task for a second user account during the on-boarding process.

16. The system of claim 14, wherein the UI process flow defines a first task associated with the on-boarding process, that when executed, is configured to cause the client application to render a first UI object on the user interface of the client application for a first user account, and the UI process flow defines a second task associated with the on-boarding process, that when executed, is configured to cause the client application to render a second UI object on the user interface of the client application for a second user account, the second task being a variation of the first task.

17. The system of claim 16, wherein the UI task manager includes a task tracker configured to generate one or more UI task statistics for the first task and the second task.

18. The system of claim 14, wherein the UI task manager is configured to cause an insertion of a UI object relating to one or more permissions to obtain user consent in response to a user account being associated with a geographical region that is different than a geographical region originally associated with the user account.

19. The system of claim 14, wherein the UI task manager is configured to cause an insertion of a UI object relating to an informational announcement in a timeline or a profile of a user account.

20. A non-transitory computer readable medium including executable instructions that when executed by at least one processor is configured to cause the at least one processor to manage an on-boarding process of users to a messaging platform, the executable instructions including instructions to:
- transmit, by a client application executable by a computing device, a request to receive a task of a UI process flow relating to the on-boarding process from the messaging platform, the UI process flow defining a flow logic for a plurality of nodes representing tasks to be executed by the client application;
- receive, by the client application, a task request from the messaging platform, the task request including an identifier of a generic UI component and configuration data that configures the generic UI component;
- obtain, by the client application, the generic UI component from a library of generic UI components stored on the client application based on the identifier;
- render, by the client application, a UI object on a user interface of the client application based on the generic UI component and the configuration data;
- transmit, by the client application, a task response to the messaging platform, the task response including user-provided data received via the UI object; and
- transmit, by the client application, a request to receive a subsequent task of the UI process.

21. The non-transitory computer readable medium of claim 20, wherein the UI object is rendered in a user's timeline on the client application.

* * * * *